(12) United States Patent
Sakata

(10) Patent No.: US 9,417,828 B2
(45) Date of Patent: Aug. 16, 2016

(54) IMAGE FORMING APPARATUS FOR ALERTING A USER TO AN UNDESIRED MAGNIFICATION OF A DOCUMENT WHEN COPYING THE DOCUMENT

(71) Applicant: Kaori Sakata, Kanagawa (JP)

(72) Inventor: Kaori Sakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/593,321

(22) Filed: Jan. 9, 2015

(65) Prior Publication Data
US 2015/0201106 A1 Jul. 16, 2015

(30) Foreign Application Priority Data

Jan. 15, 2014 (JP) .................. 2014-004708
Dec. 24, 2014 (JP) .................. 2014-259865

(51) Int. Cl.
| H04N 1/00 | (2006.01) |
| H04N 1/32 | (2006.01) |
| G06F 3/12 | (2006.01) |

(52) U.S. Cl.
CPC ............ *G06F 3/1258* (2013.01); *G06F 3/1208* (2013.01); *G06F 3/1255* (2013.01); *G06F 3/1285* (2013.01); *H04N 1/0048* (2013.01); *H04N 1/0049* (2013.01); *H04N 1/00472* (2013.01); *H04N 1/00482* (2013.01); *H04N 2201/0094* (2013.01)

(58) Field of Classification Search
CPC .......... H04N 1/32657; H04N 1/00482; H04N 1/0049; H04N 1/32635; H04N 1/0048; H04N 1/00472; H04N 2201/0094; H04N 1/32609; H04N 1/32625; H04N 1/3263; H04N 1/0071; G06F 3/1294; G06F 3/1208; G06F 3/1255; G06F 3/1258
USPC .......... 358/1.2, 474, 505, 1.18, 449
See application file for complete search history.

(56) References Cited

U.S. PATENT DOCUMENTS

| 4,701,805 A * | 10/1987 | Maeshima ............. H04N 1/193 358/3.06 |
| 7,639,278 B2 * | 12/2009 | Goto et al. ................. 348/207.2 |
| 8,842,312 B2 * | 9/2014 | Lao et al. ..................... 358/1.15 |
| 2001/0007619 A1 * | 7/2001 | Kakutani ...................... 400/582 |
| 2002/0085186 A1 * | 7/2002 | Sawada ........................... 355/40 |
| 2002/0171681 A1 * | 11/2002 | Nomura et al. ............... 345/772 |
| 2005/0036170 A1 * | 2/2005 | Okuoka et al. .............. 358/1.16 |
| 2013/0155423 A1 * | 6/2013 | Shibata ......................... 358/1.2 |
| 2014/0362402 A1 * | 12/2014 | Tsuboi ............... H04N 1/00411 358/1.15 |

FOREIGN PATENT DOCUMENTS

JP 2007-251795 9/2007

* cited by examiner

*Primary Examiner* — Eric A Rust
(74) *Attorney, Agent, or Firm* — Harness, Dickey & Pierce, P.L.C.

(57) ABSTRACT

An image forming apparatus capable of scanning document includes a scanner to generate document image by scanning document, and a display to display an alarm screen to alert a size change of a recording medium to a user when print magnification ratio of document image is changed and then a print operation is instructed without changing a size of recording medium to be printed with document image.

12 Claims, 10 Drawing Sheets

FIG. 8

| TYPE OF APPARATUS | XXX |
|---|---|
| COLOR PRINTING CAPABILITY | 1 |
| DOCUMENT SIZE DETECTION | 0 |

IMAGE FORMING APPARATUS FOR ALERTING A USER TO AN UNDESIRED MAGNIFICATION OF A DOCUMENT WHEN COPYING THE DOCUMENT

CROSS-REFERENCE TO RELATED APPLICATION

This application claims priority pursuant to 35 U.S.C. §119 (a) to Japanese Patent Application Nos. 2014-004708, filed on Jan. 15, 2014, and 2014-259865, filed on Dec. 24, 2014 in the Japan Patent Office, the disclosure of which are incorporated by reference herein in their entirety.

BACKGROUND

1. Technical Field

The present invention relates to an image forming apparatus having capability of document copying.

2. Background Art

Image forming apparatuses that can scan document image correctly and print the document image without causing lack of document image have been proposed. In these image forming apparatuses, document is scanned to generate document image. The generated document image and a given format for image are cross-checked to determine whether an image in the document image is not printed within a recoding medium, which may be caused when document is conveyed with slanted condition.

However, when the image forming apparatus executes an copying operation of document by changing magnification, which means when document is scanned and magnification-changed printing is executed, depending on print magnification ratio designated by a user, the document image after changing the magnification may become greater than a size of a sheet used as a recording medium, or document image may be reduced too much.

SUMMARY

In one aspect of the present invention, an image forming apparatus capable of scanning document includes a scanner to generate document image by scanning document, and a display to display an alarm screen to alert a size change of a recording medium to a user when print magnification ratio of document image is changed and then a print operation is instructed without changing a size of recording medium to be printed with document image.

In another aspect of the present invention, a method of forming an image is devised. The method includes the steps of generating document image by scanning document, and displaying an alarm screen to alert a size change of a recording medium to a user when a print magnification ratio of document image is changed and then a print operation is instructed without changing a size of recording medium to be printed with document image.

In another aspect of the present invention, a non-transitory computer-readable storage medium storing a program that, when executed by a computer having a processing circuit, causes the computer to execute a method of forming an image is devised. The method includes the steps of generating document image by scanning document, and displaying an alarm screen to alert a size change of a recording medium to a user when a print magnification ratio of document image is changed and then a print operation is instructed without changing a size of recording medium to be printed with document image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is an example of specification information of an image forming apparatus of FIG. 1;

Figure 1:
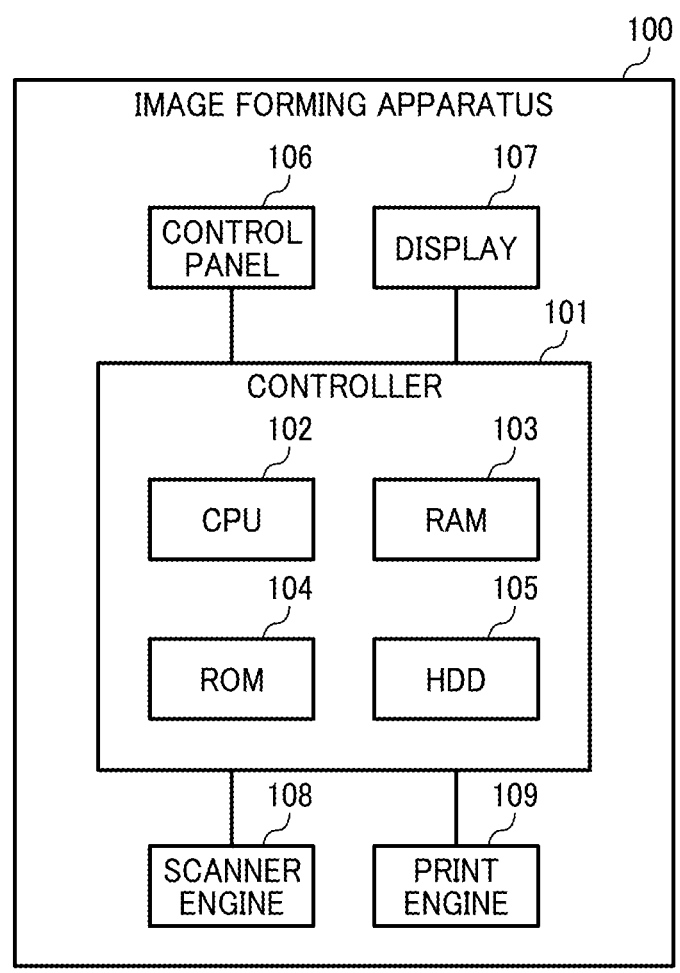
FIG. 1 is a hardware configuration of an image forming apparatus according to one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to example embodiments is described hereinafter.

FIG. 1 is a hardware configuration of an image forming apparatus 100 according to one or more example embodiments. The image forming apparatus 100 can execute printing operation and scanning. The image forming apparatus 100 can be, for example, a multifunctional peripherals (MFP) of a laser type or an inkjet type.

The image forming apparatus 100 includes, for example, a controller 101, a control panel 106, a display 107, a scanner engine 108, and a print engine 109.

The controller 101, which is a control circuitry or a processor, controls the image forming apparatus 100 as a whole. The controller 101 includes, for example, a central processing unit (CPU) 102, a random access memory (RAM) 103 used as a working area of program, a read only memory (ROM) 104, and a hard disk drive (HDD) 105. Under the control of operating system (OS), the CPU 102 reads out one or more programs according to one or more example embodiments described with various programming languages from the HDD 105, loads the programs on the RAM 103 and executes the programs to devise one or more functions to be described later.

The control panel 106 can be used as a receiving unit that receives various instructions to be input to the image forming apparatus 100 from, for example, a user. The display 107 is a display device such as a liquid crystal display that can display various graphical user interfaces (GUIs). Further, the display 107 includes, for example, a touch panel type or a non-touch panel type.

As to the image forming apparatus 100 employing a display device of touch panel type, the control panel 106 and the display 107 collectively correspond to the display device, in which the control panel 106 includes, for example, operation buttons disposed on an operation board of the image forming apparatus 100 in addition to the display device of touch panel type.

As to the image forming apparatus 100 employing a display device of non-touch panel type, the display device corresponds to the display 107, and operation buttons disposed on an operation board of the image forming apparatus 100 corresponds to the control panel 106.

The scanner engine 108 is used as a reader or a scanner that reads or scans document to generate image data. The print engine 109 is used as a printing apparatus that prints image data and print data generated by the scanner engine 108 on a recording medium or a print medium.

Figure 2:
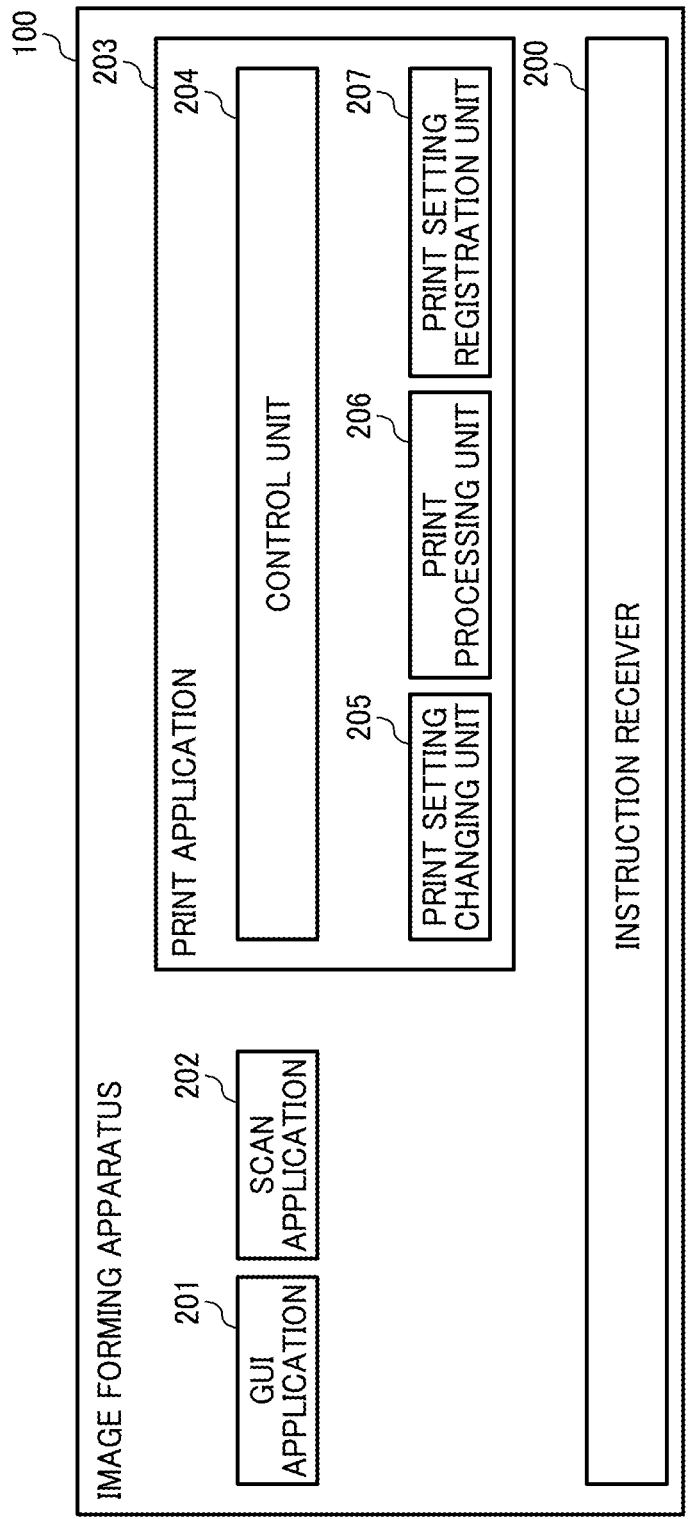
FIG. 2 is a functional block diagram of the image forming apparatus of FIG. 1.

FIG. 2 is an example of a functional configuration of the image forming apparatus 100. A description is given of the functional configuration of the image forming apparatus 100 with reference to FIG. 2.

The image forming apparatus 100 includes, for example, an instruction receiver 200, a graphical user interface (GUI) application 201, a scan application 202, and a print application 203.

The instruction receiver 200 is used as a receiving unit that receives an instruction input by a user through the control panel 106 and/or the display 107. Upon receiving the instruction from the user, the instruction receiver 200 reports contents of the instruction to the GUI application 201, the scan application 202, and the print application 203 related to the instruction.

The GUI application 201 controls the display 107. The GUI application 201 displays various GUIs on the display 107 depending on the scan application 202, the print application 203, and user's instruction.

The scan application 202 controls the scanner engine 108 to scan document for generating image data. Upon receiving a copy instruction of document from the instruction receiver 200, the scan application 202 scans document to generate image data.

The print application 203 controls the print engine 109 to execute print processing. The print application 203 includes, for example, a control unit 204, a print setting changing unit 205, a print processing unit 206, and a print setting registration unit 207.

The control unit 204, which is a control circuitry or a processor, controls the print application 203 as a whole. The print setting changing unit 205 is used as a changing unit to change print setting information such as print magnification ratio, sheet size, duplex printing, condensed printing, dividing printing, sorting, density, image quality, and color balance based on a user's instruction.

The print processing unit 206 controls the print engine 109. Based on print setting information, the print processing unit 206 instructs the print engine 109 to print image data generated by the scan application 202.

The print setting registration unit 207 is used as a registration unit to register print setting information. The print setting registration unit 207 stores identification information of print setting information designated by a user (hereinafter, print setting identification information) in a memory by correlating the identification information and the print setting information.

Figure 3:
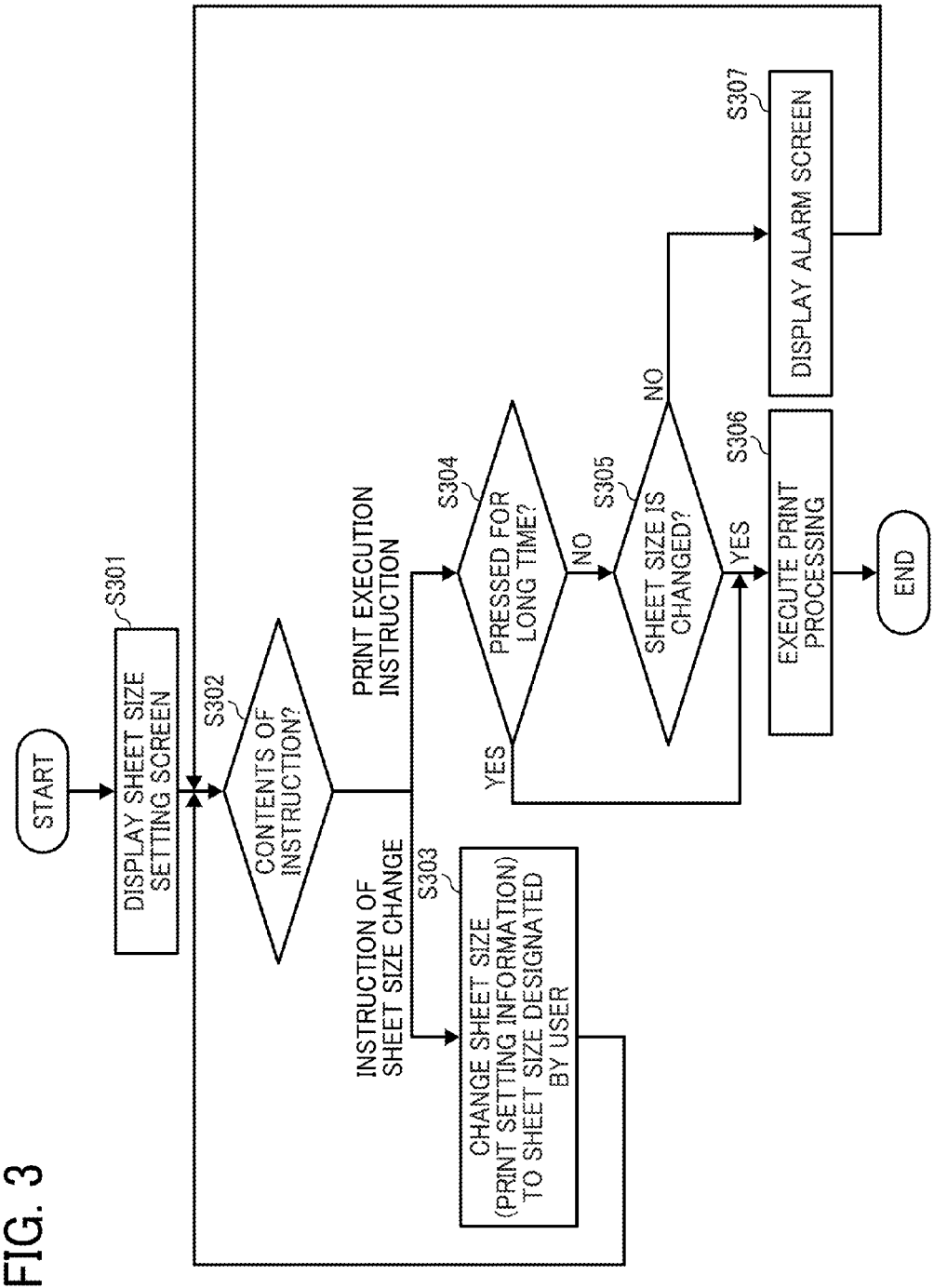
FIG. 3 is a flowchart showing the steps of process executable by the image forming apparatus of FIG. 1.

FIG. 3 is a flowchart showing the steps of a process executable by the image forming apparatus 100. With reference to FIG. 3, a description is given of a process executable by the image forming apparatus 100 having a display device of non-touch panel type when a user changes print magnification ratio using a magnification setting screen 400 illustrated in FIG. 4.

Figure 4:
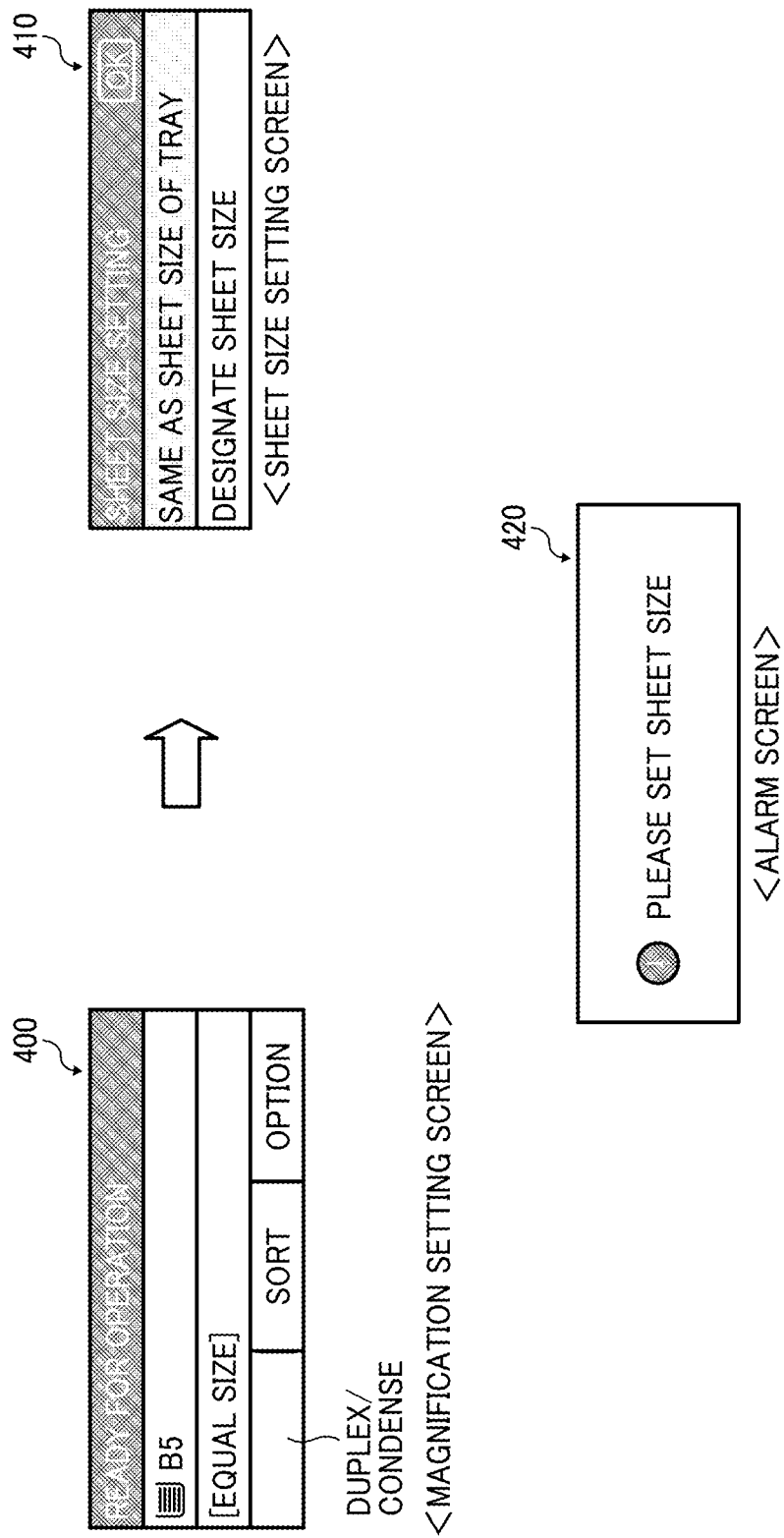
FIG. 4 is examples of graphical user interface (GUI) displayable on a display of the image forming apparatus of FIG. 1.

When the process starts, at step S301, the GUI application 201 of the image forming apparatus 100 displays a sheet size setting screen 410, illustrated in FIG. 4, on the display 107. Therefore, when a user changes the print magnification ratio by using the magnification setting screen 400, the sheet size setting screen 410 is displayed, with which a situation that a user forgets to change the sheet size can be prevented.

At step S302, the control unit 204 of the print application 203 determines contents of a user's instruction, received from the instruction receiver 200, and proceeds the process depending on contents of the user's instruction, Specifically, when it is determined that a change of sheet size, which is a part of print setting information, is instructed, the process proceeds to step S303. At step S303, the print setting changing unit 205 changes the sheet size to a sheet size designated by a user using the sheet size setting screen 410, and returns the process to step S302.

When the control unit 204 determines that a print execution is instructed by pressing a print execution button of the control panel 106 at step S302, the control unit 204 proceeds the process to step S304. At step S304, the control unit 204 determines whether the print execution button is pressed for long time. If the print execution button is pressed for long time (S304: Yes), the process proceeds to step S306. By contrast, if the print execution button is not pressed for long time (S304: No), the process proceeds to step S305. In this process, the long time press means whether the print execution button is being pressed for a given time or more. Therefore, at S304, it is determined whether the print execution button is being pressed for a given time or more.

At step S305, the control unit 204 determines whether a user changes a sheet size by using the sheet size setting screen 410. If the sheet size is changed (S305: Yes), the process proceeds to step S306. At step S306, the print processing unit 206 executes print processing based on the print setting information changed by the user, and then the process ends.

By contrast, when it is determined that the sheet size is not changed (S305: No), the process proceeds to step S307. At step S307, the control unit 204 instructs the GUI application 201 to display an alarm screen 420, illustrated in FIG. 4, on the display 107, and returns the process to step S302.

At this stage, the control unit 204 can display the alarm screen 420 on the display 107 and a report message that the print processing can be executed on the display 107 by pressing the print execution button for long time. A user can set in advance whether the report message is to be displayed using a management menu displayed on the display 107. The control unit 204 displays the report message on the display 107 based on the setting.

FIG. 4 illustrates examples of graphical user interface (GUI) displayable on the display 107 of the image forming apparatus 100. The magnification setting screen 400 is a screen used for setting print magnification ratio. A user can designate print magnification ratio of document image by using the magnification setting screen 400, in which the print magnification ratio can be designated to the same size of document, or the print magnification ratio can be designated by setting numerical values.

The sheet size setting screen 410 is used as a screen for setting a size of a sheet used as a recording medium or a print medium. A user can designate a sheet size by selecting or inputting a sheet size using the sheet size setting screen 410.

The alarm screen 420 is used as a screen for alerting a change of sheet size to a user. The alarm screen 420 is displayed when a user changes print magnification ratio by using the magnification setting screen 400 but the sheet size is not yet changed. As to the above described image forming apparatus 100, the alarm screen 420 is displayed to alert a change of sheet size to a user when print magnification ratio is changed, with which problems such as partial cutting of image caused by forgetting changing a sheet size can be prevented. When the partial cutting of image occurs, the image cannot be printed correctly and some part of the image is not printed on a sheet.

Figure 5:
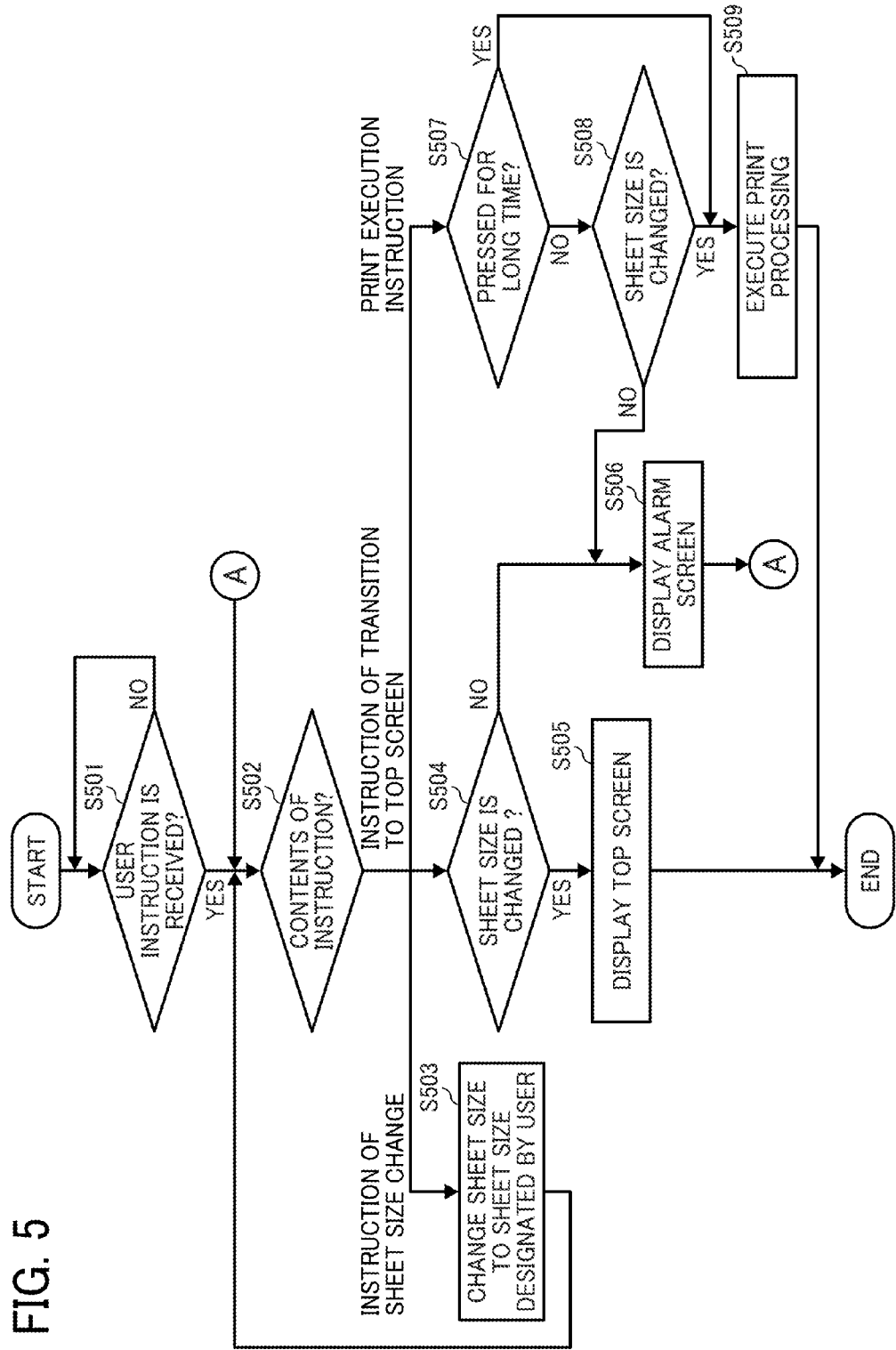
FIG. 5 is a flowchart showing the steps of another process executable by the image forming apparatus of FIG. 1.

FIG. 5 is a flowchart showing the steps of another process executable by the image forming apparatus 100. With reference to FIG. 5, a description is given of another process executable by the image forming apparatus 100 having a display device of touch panel type when a user changes print magnification ratio using a print setting screen 710 illustrated in FIG. 7.

At step S501, the control unit 204 of the print application 203 determines whether a user instruction is received. If the user instruction is not received (S501: No), the process repeats step S501. By contrast, If the user instruction is received (S501: Yes), the process proceeds to step S502.

At step S502, the control unit 204 determines contents of the user's instruction, received from the instruction receiver 200, and proceeds the process depending on the contents of the user's instruction, Specifically, when it is determined that a change of sheet size, which is a part of print setting information, is instructed, the process proceeds to step S503. At step S503, the print setting changing unit 205 changes the sheet size to a sheet size designated by the user using the print setting screen 710, and returns the process to step S502.

When the control unit 204 determines that an instruction of transition to a TOP screen is received by a pressing operation of the OK button on the print setting screen 710 at step S502, the control unit 204 proceeds the process to step S504.

At step S504, the control unit 204 determines whether the user changes the sheet size using the print setting screen 710. When it is determined that the sheet size is not changed (S504: No), the process proceeds to step S506, and the control unit 204 instructs the GUI application 201 to display the alarm screen 420 illustrated in FIG. 4 on the display 107, and returns the process to step S502.

By contrast, when it is determined that the sheet size is changed (step S504: Yes), the process proceeds to step S505. At step S505, the control unit 204 instructs the GUI application 201 to display a TOP screen 700 illustrated in FIG. 7 on the display 107, and then the process ends.

When it is determined that the print execution is instructed by a pressing operation of the print execution button of the control panel 106 at step S502, the process proceeds to step S507. At step S507, the control unit 204 determines whether the print execution button is pressed for long time. If the print execution button is pressed for long time (S507: Yes), the process proceeds to step S509. By contrast, if the print execution button is not pressed for long time (S507: No), the process proceeds to step S508.

At step S508, the control unit 204 determines whether the user changes the sheet size by using the print setting screen 710. When it is determined that sheet size is not changed (S508: No), the process proceeds to step S506, and the control unit 204 instructs the GUI application 201 to display the alarm screen 420, illustrated in FIG. 4, on the display 107, and returns the process to step S502.

By contrast, when it is determined that the sheet size is changed (S508: Yes), the process proceeds to step S509. At step S509, the print processing unit 206 executes print processing based on the print setting information changed by the user, and the process ends.

Figure 6:
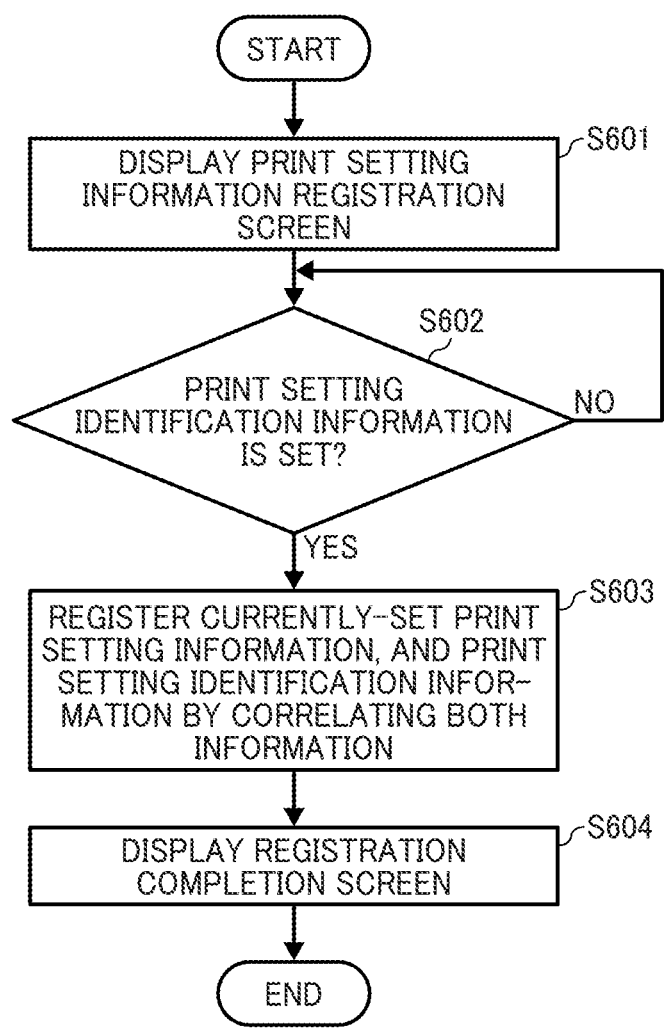
FIG. 6 is a flowchart showing the steps of another process executable by the image forming apparatus of FIG. 1.

FIG. 6 is a flowchart showing the steps of another process executable by the image forming apparatus 100. With reference to FIG. 6, a description is given of a process executable by the image forming apparatus 100 when a user instructs registration of print setting information using a TOP screen 700 illustrated in FIG. 7.

The process shown in FIG. 6 is started when a user presses a registration button 702, displayed on the TOP screen 700, to instruct a registration of print setting information. At step S601, the print setting registration unit 207 of the print application 203 displays a print setting information registration screen 720 on the display 107 as illustrated in FIG. 7.

At step S602, the print setting registration unit 207 determines whether a user sets print setting identification information by using the print setting information registration screen 720. In this configuration, the print setting registration unit 207 determines that the print setting identification information is set when a set button 724 is pressed under a condition that a string of text is input in an input field 722 of the print setting information registration screen 720.

If the print setting identification information is not set (S602: No), the process repeats step S602. By contrast, if the print setting identification information is set (S602: Yes), the process proceeds to step S603. At step S603, the print setting registration unit 207 registers currently-set print setting information, and the print setting identification information set by the user to a memory used as a storage device by correlating the currently-set print setting information and the print setting identification information set by the user. At step S604, the control unit 204 instructs the GUI application 201 to display a registration completion screen 730 illustrated in FIG. 7 on the display 107, and then the process ends.

Figure 7:
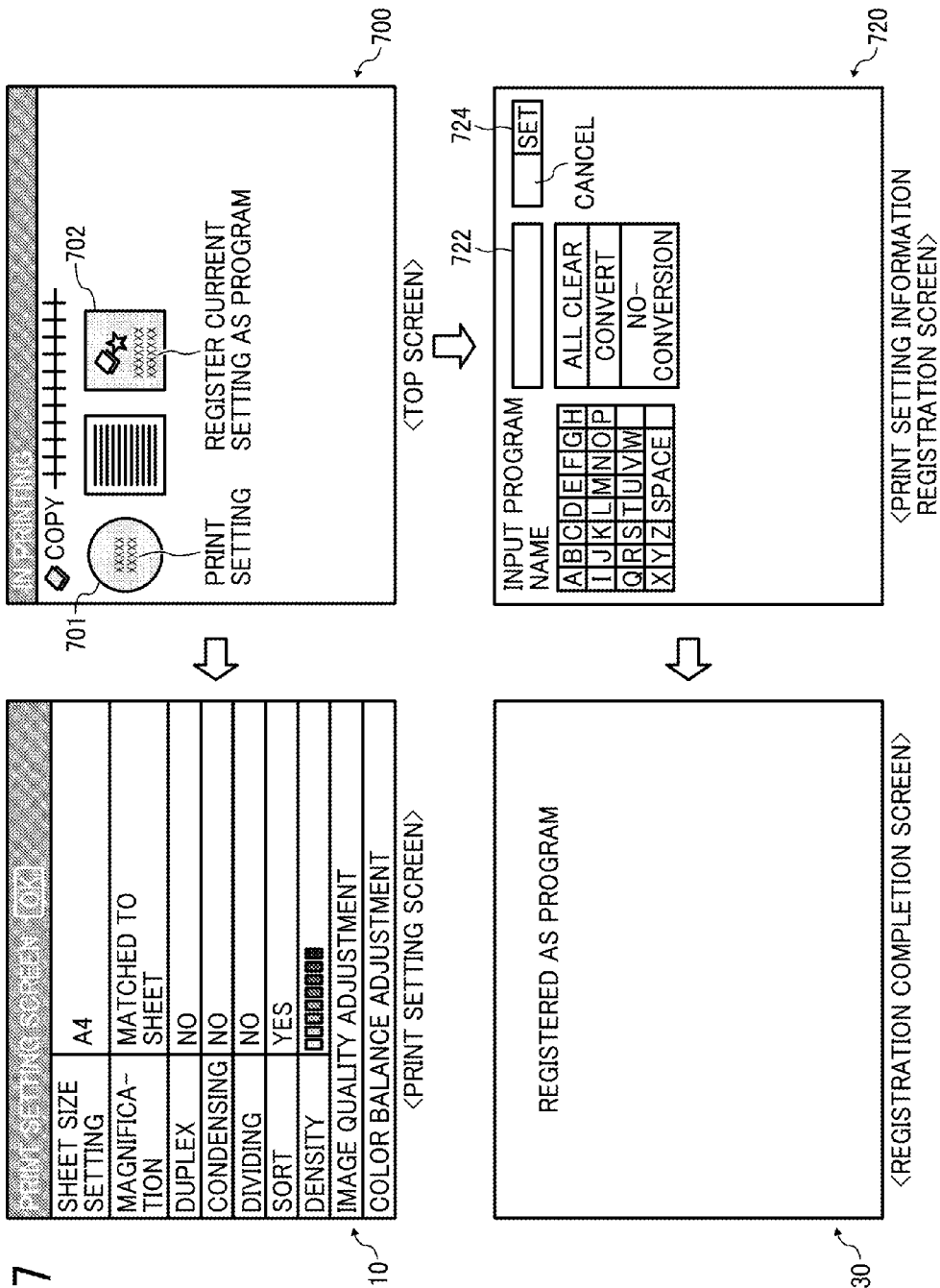
FIG. 7 is another examples of graphical user interface (GUI) displayable on a display of the image forming apparatus of FIG. 1.

FIG. 7 is another example of GUI displayed on the display 107 of the image forming apparatus 100.

The TOP screen 700 is a top screen which is displayed when copying process of document is executed. The TOP screen 700 includes, for example, a print setting button 701, and a registration button 702 for registering print setting information. The print setting button 701 is used as a button for displaying the print setting screen 710. The registration button 702 for registering print setting information is used as a button for displaying the print setting information registration screen 720.

The print setting screen 710 is used to set print setting information such as sheet size, print magnification ratio, duplex printing, condensed printing, dividing printing, sorting, density, image quality adjustment, and color balance. A user can change the print setting information by touching an area on the print setting screen 710 displaying print setting information to be changed.

For example, when a user touches an area of "magnification-change", the GUI application 201 displays selectable magnification ratio, and a method of magnification-change adapted to a sheet on the print setting screen 710. When a user designates a magnification ratio, and a method of magnification-change, the print setting changing unit 205 of the print application 203 stores the magnification ratio and the method of magnification-change designated by the user to a memory, used as a storage device, as the print setting information.

Further, when a user touches an area of "sheet size setting", the GUI application 201 displays selectable sheet size such as A4 on the print setting screen 710. When the user selects the sheet size, the print setting changing unit 205 stores the sheet size selected by the user to a memory, used as a storage device, as the print setting information.

The print setting information registration screen 720 is used as a screen to register currently-set print setting information by correlating the currently-set print setting information and the print setting identification information. The print setting screen 710 includes the input field 722 for inputting print setting identification information, in which a user can input a string of text.

When the user presses the set button 724 after inputting the string of text in the input field 722, the print setting registration unit 207 of the print application 203 stores the currently-set print setting information and, the print setting identification information input to the field 722 to a memory, used as a storage device, by correlating the currently-set print setting information and the input print setting identification information.

The GUI application 201 can display a button indicating the print setting identification information, registered by the above described process, on the TOP screen 700. When a user presses this button, the print setting changing unit 205 of the print application 203 changes current print setting information to print setting information correlated to the print setting identification information indicated by this button.

As to the image forming apparatus 100 having a display device of touch panel type illustrated in FIG. 7, the display device displays the print setting information registration screen 720 to register print setting information.

In this case, the print setting registration unit 207 stores the currently-set print setting information, print setting identification information designated by the print setting information registration screen 720, and a given operation button of the control panel 106 of the image forming apparatus 100 to a memory, used as a storage device, by correlating the currently-set print setting information, the designated print setting identification information, and the operation button. When a user presses the operation button, the print setting changing unit 205 changes currently-set print setting information to the print setting information related to the operation button.

FIG. 8 is an example of specification information of an image forming apparatus according to one or more example embodiments. The specification information of image forming apparatus includes, for example, information of type of apparatus, color printing capability, and document size detection. The specification information of image forming apparatus is prepared for each type of apparatus. The specification information of image forming apparatus can be stored in the ROM 104 of the controller 101, and is referred by the print application 203 as required.

The type of apparatus is information indicating a type of an image forming apparatus. The color printing capability is information indicating whether an image forming apparatus identified by the type of apparatus has capability of color printing. In this description, when the color printing capability has a value of "1," the image forming apparatus has color printing capability, and when the color printing capability has a value of "0," the image forming apparatus does not have color printing capability but has only monochrome printing capability.

The document size detection is information indicating whether an image forming apparatus identified by the type of apparatus has a hardware that can detect document size. In this description, when the document size detection device has a value of "1," an image forming apparatus has a hardware, and when the document size detection device has a value of "0," an image forming apparatus does not have a hardware. In this description, the hardware is, for example, a sensor that can detect sheet size.

Figure 9:
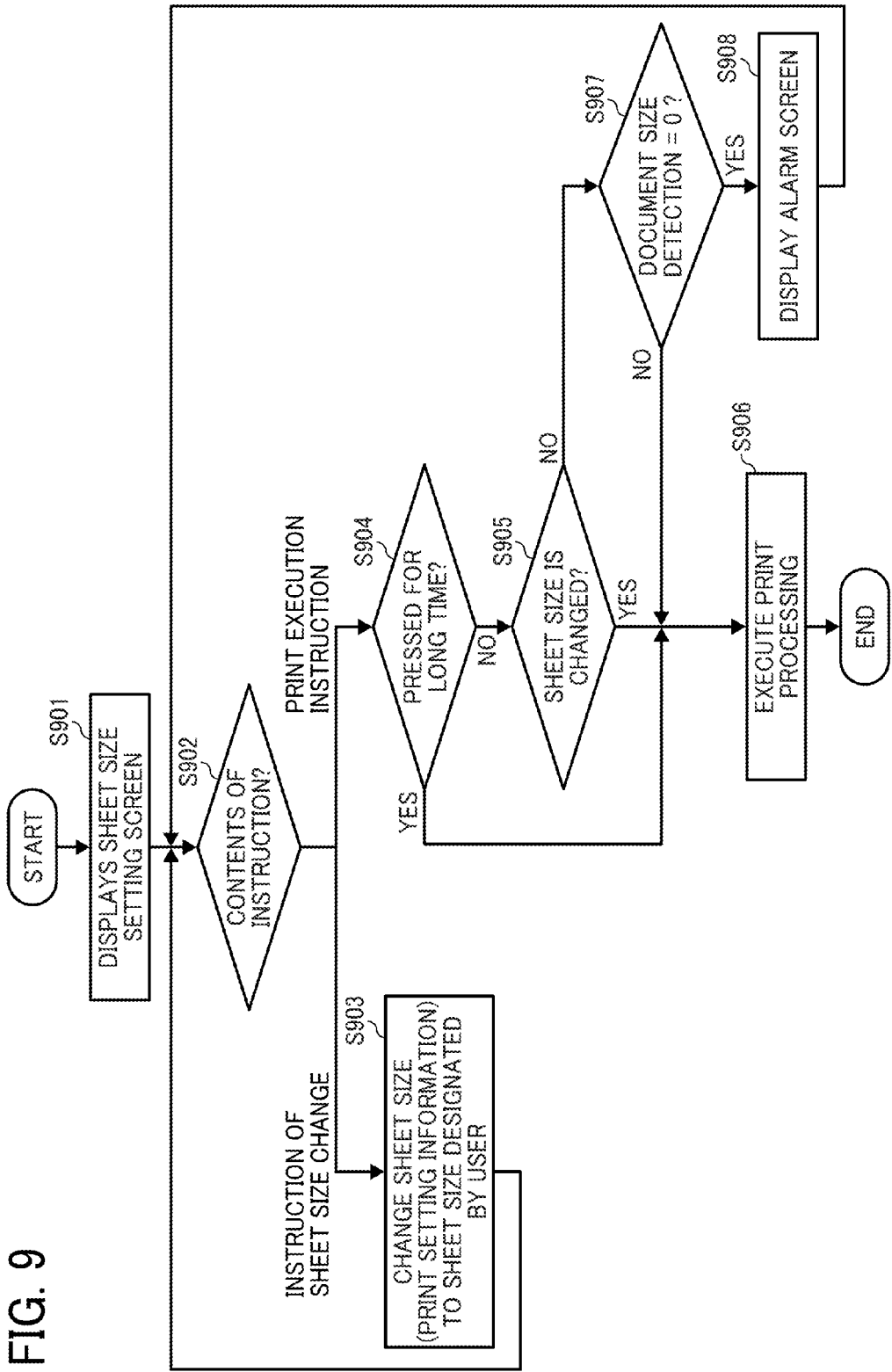
FIG. 9 is a flowchart showing the steps of another process executable by an image forming apparatus of FIG. 1.

FIG. 9 is a flowchart showing the steps of another process executable by the image forming apparatus 100. With reference to FIG. 9, a description is given of a process executable by the image forming apparatus 100 having a display device of non-touch panel type when a user changes print magnification ratio using the magnification setting screen 400 illustrated in FIG. 4.

At step S901, the GUI application 201 of the image forming apparatus 100 displays the sheet size setting screen 410, illustrated in FIG. 4, on the display 107. At step S902, the control unit 204 of the print application 203 determines contents of a user's instruction, received from the instruction receiver 200, and proceeds the process depending on contents of the user's instruction, Specifically, when it is determined that a change of sheet size, which is a part of print setting information, is instructed, the process proceeds to step S903. At step S903, the print setting changing unit 205 changes the sheet size to a sheet size designated by a user using the sheet size setting screen 410, and returns the process to step S902.

When the control unit 204 determines that a print execution is instructed by pressing a print execution button of the control panel 106 at step S902, the control unit 204 proceeds the process to step S904. At step S904, the control unit 204 determines whether the print execution button is pressed for long time. If the print execution button is pressed for long time (S904: Yes), the process proceeds to step S906. By contrast, if the print execution button is not pressed for long time (S904: No), the process proceeds to step S905.

At step S905, the control unit 204 determines whether a user changes a sheet size by using the sheet size setting screen 410. If the sheet size is changed (S905: Yes), the process proceeds to step S906. At step S906, the print processing unit 206 executes print processing based on the print setting information changed by the user, and then the process ends.

By contrast, when it is determined that the sheet size is not changed (S905: No), the process proceeds to step S907. At step S907, the control unit 204 determines whether a value of document size detection, included in the specification information of image forming apparatus, is zero (0). If the value of document size detection is not zero (S907: No), which means that the image forming apparatus has a hardware that detects document size, the process proceeds to step S906.

By contrast, if the value of document size detection is zero (S907: Yes), which means that the image forming apparatus does not have a hardware that detects document size, the process proceeds to step S908. At step S908, the control unit 204 instructs the GUI application 201 to display the alarm screen 420, illustrated in FIG. 4, on the display 107, and returns the process to step S902.

In the example embodiment of FIG. 9, controller software can be developed without consideration whether an image forming apparatus, installed with a print application, has a hardware that detects document size, and a common controller software can be developed for image forming apparatuses having the hardware that detects document size, and image forming apparatuses not having the hardware.

Figure 10:
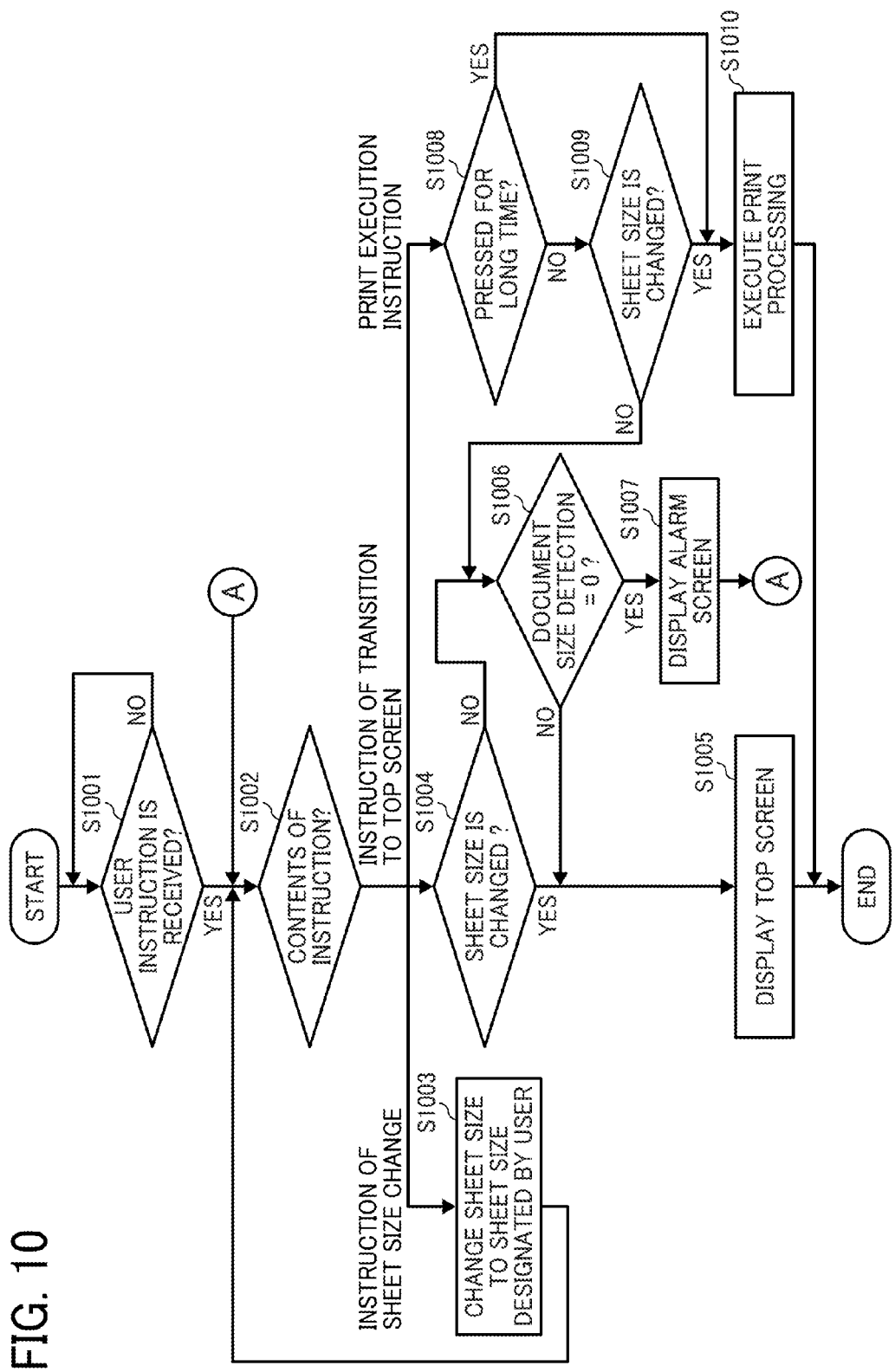
FIG. 10 is a flowchart showing the steps of another process executable by the image forming apparatus of FIG. 1.

FIG. 10 is a flowchart showing the steps of another process executeable by the image forming apparatus 100. With reference to FIG. 10, a description is given of another process executeable by the image forming apparatus 100 having a display device of touch panel type when a user changes print magnification ratio using the print setting screen 710 illustrated in FIG. 7.

At step S1001, the control unit 204 of the print application 203 determines whether a user instruction is received. If the user instruction is not received (S1001: No), the process repeats step S1001. By contrast, if the user instruction is received (S1001: Yes), the process proceeds to step S1002.

At step S1002, the control unit 204 determines contents of the user's instruction, received from the instruction receiver 200, and proceeds the process depending on the contents of the user's instruction, Specifically, when it is determined that a change of sheet size, which is a part of print setting information, is instructed, the process proceeds to step S1003. At step S1003, the print setting changing unit 205 changes the sheet size to a sheet size designated by the user using the print setting screen 710, and returns the process to step S1002.

When the control unit 204 determines that an instruction of transition to the TOP screen is received by a pressing operation of the OK button on the print setting screen 710 at step S1002, the control unit 204 proceeds the process to step S1004. At step S1004, the control unit 204 determines whether the user changes the sheet size using the print setting screen 710.

When it is determined that the sheet size is changed (step S1004: Yes), the process proceeds to step S1005. At step S1005, the control unit 204 instructs the GUI application 201 to display the TOP screen 700 illustrated in FIG. 7 on the display 107, and then the process ends.

By contrast, when it is determined that the sheet size is not changed (S1004: No), the process proceeds to step S1006. At step S1006, the control unit 204 determines whether a value of document size detection, included in the specification information of an image forming apparatus, is zero (0). If the value of document size detection is not zero (S906: No), which means that the image forming apparatus has a hardware that detects document size, the process proceeds to step S1005.

By contrast, if the value of document size detection is zero (S1006: Yes), which means that the image forming apparatus does not have a hardware that detects document size, the process proceeds to step S1007. At step S1007, the control unit 204 instructs the GUI application 201 to display the alarm screen 420, illustrated in FIG. 4, on the display 107, and returns the process to step S1002.

When the control unit 204 determines that a print execution is instructed by pressing a print execution button of the control panel 106 at step S1002, the control unit 204 proceeds the process to step S1008. At step S1008, the control unit 204 determines whether the print execution button is pressed for long time. If the print execution button is pressed for long time (S1008: Yes), the process proceeds to step S1010. By contrast, if the print execution button is not pressed for long time (S1008: No), the process proceeds to step S1009.

At step S1009, the control unit 204 determines whether a user changes a sheet size by using the print setting screen 710. When it is determined that the sheet size is not changed (S1009: No), the process proceeds to step S1006. By contrast, when it is determined that the sheet size is changed (S1009: Yes), the process proceeds to step S1010. At step S1010, the print processing unit 206 executes print processing based on the print setting information changed by the user, and then the process ends.

In the example embodiment of FIG. 10, controller software can be developed without consideration whether an image forming apparatus, installed with a print application, has a hardware that detects document size, and a common controller software can be developed for image forming apparatuses having the hardware that detects document size, and image forming apparatuses not having the hardware.

As to the above described image forming apparatus and software program, when the image forming apparatus executes an copying operation of document by changing magnification, problems such as the size of document image becomes greater than a size of a sheet used as a recording medium by changing the magnification, or document image is reduced too much can be prevented.

The present invention can be implemented in any convenient form, for example using dedicated hardware, or a mixture of dedicated hardware and software.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus configured to scan a document, comprising:
   a scanner configured to generate a document image by scanning the document;
   a processor configured to,
      receive a print operation instruction to print the document image,
      determine whether a user has adjusted a designated size of a recording medium associated with the print operation if a print magnification ratio of the document image has changed,
      determine if the image forming apparatus includes a sensor configured to detect the designated size of the recording medium, and
      generate an alarm screen if the processor determines that the print magnification ratio associated with the document image has changed while the user has not adjusted the designated size of the recording medium and the image forming apparatus does not include the sensor; and
   a display configured to display the alarm screen to alert the user that the designated size of the recording medium needs adjusting.

2. The image forming apparatus of claim 1, wherein the processor is further configured to,
   designate print setting information based on input from the user, and
   print the document image based on the print setting information.

3. The image forming apparatus of claim 2, wherein the processor is further configured to register the print setting information designated by the user with identification information of the print setting information by correlating the print setting information and the identification information.

4. The image forming apparatus of claim 1, wherein if the processor determines that the image forming apparatus includes the sensor, the processor is configured to adjust a designed size of the print document image based on an information from the sensor.

5. A method of forming an image, the method comprising:
   generating a document image by scanning a document;
   receiving a print operation instruction to print the document image;
   first determining whether a user has adjusted a designated size of a recording medium associated with the print operation if a print magnification ratio of the document image has changed;
   second determining if an image forming apparatus includes a sensor configured to detect the designated size of the recording medium;
   generating an alarm screen if the first determining determines that the print magnification ratio associated with the document image has changed while the user has not adjusted the designated size of the recording medium and the second determining determines that the image forming apparatus does not include the sensor; and
   displaying the alarm screen to alert the user that the designated size of the recording medium needs adjusting.

6. The method of claim 5, further comprising:
   changing print setting information of the image forming apparatus based on an instruction from the user; and
   printing the document image based on the print setting information.

7. The method of claim 6, further comprising:
   registering the print setting information with identification information of the print setting information by correlating the print setting information and the identification information.

8. The method of claim 5, further comprises:
   adjusting a designed size of the print document image based on an information from the sensor, if the second determining determines that the image forming apparatus includes the sensor.

9. A non-transitory computer-readable storage medium storing a program that, when executed by a computer having a processing circuit, causes the computer to execute a method of forming an image, the method comprising:
   generating a document image by scanning a document;
   receiving a print operation instruction to print the document image;
   first determining whether a user has adjusted a designated size of a recording medium associated with the print operation if a print magnification ratio of the document image has changed;
   second determining if an image forming apparatus includes a sensor configured to detect the designated size of the recording medium;
   generating an alarm screen if the first determining determines that the print magnification ratio associated with the document image has changed while the user has not adjusted the designated size of the recording medium and the second determining determines that the image forming apparatus does not include the sensor; and
   displaying the alarm screen to alert the user that the designated size of the recording medium needs adjusting.

10. The non-transitory computer-readable storage medium of claim 9, wherein the program, when executed, further causes the computer to,
    change print setting information of the image forming apparatus based on an instruction from the user; and
    print the document image based on the print setting information.

11. The non-transitory computer-readable storage medium of claim 10, wherein the program, when executed, further causes the computer to register the print setting information designated by the user with identification information of the print setting information by correlating the print setting information and the identification information of the print setting information.

12. The non-transitory computer-readable storage medium of claim 9, wherein the program, when executed, further causes the computer to adjust a designed size of the print document image based on an information from the sensor, if the computer determines that the image forming apparatus includes the sensor.

* * * * *